United States Patent
Mallavarapu et al.

(10) Patent No.: US 9,876,243 B2
(45) Date of Patent: Jan. 23, 2018

(54) METHOD TO REDUCE PRESSURE WHEN INJECTORS ARE STUCK OPEN UNDER FAULTED CONDITIONS AND REMEDIAL ACTION TO PREVENT WALK-HOME INCIDENT

(71) Applicant: GM Global Technology Operations LLC, Detroit, MI (US)

(72) Inventors: Kiran Mallavarapu, Sharon, MA (US); Abdullah B. Alp, West Henrietta, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/987,800

(22) Filed: Jan. 5, 2016

(65) Prior Publication Data

US 2016/0118678 A1    Apr. 28, 2016

Related U.S. Application Data

(63) Continuation of application No. 11/678,743, filed on Feb. 26, 2007, now Pat. No. 9,263,751.

(51) Int. Cl.
| | |
|---|---|
| *H01M 8/24* | (2016.01) |
| *H01M 8/04664* | (2016.01) |
| *H01M 8/04089* | (2016.01) |
| *H01M 8/249* | (2016.01) |
| *H01M 8/04746* | (2016.01) |

(52) U.S. Cl.
CPC ... *H01M 8/04686* (2013.01); *H01M 8/04089* (2013.01); *H01M 8/04104* (2013.01); *H01M 8/04753* (2013.01); *H01M 8/249* (2013.01); *H01M 2250/30* (2013.01); *Y02B 90/18* (2013.01); *Y02E 60/50* (2013.01)

(58) Field of Classification Search
CPC .... H01M 8/04089; H01M 8/04; H01M 8/249; H01M 8/04104; H01M 8/04753; H01M 2250/30; Y02E 60/50
USPC ........ 429/408, 146, 427, 428–433, 443–444, 429/456, 458, 512, 515–516, 535; 700/286, 291, 295; 204/228.1, 204/228.4–228.5, 242; 302/101; 73/37, 73/40, 40.5 R
See application file for complete search history.

(56) References Cited

U.S. PATENT DOCUMENTS

| | | | |
|---|---|---|---|
| 6,849,352 B2 | 2/2005 | Formanski et al. | |
| 2002/0192519 A1* | 12/2002 | Fujita | B60L 11/1887 429/432 |
| 2004/0131902 A1* | 7/2004 | Frank | H01M 8/04007 429/421 |
| 2006/0228601 A1* | 10/2006 | Yoshida | H01M 8/04231 429/415 |
| 2006/0246177 A1* | 11/2006 | Miki | F17C 5/007 426/24 |

* cited by examiner

Primary Examiner — Miriam Stagg
Assistant Examiner — Claire L Roe
(74) Attorney, Agent, or Firm — Quinn IP Law

(57) ABSTRACT

A method for controlling a fuel cell system, capable of quickly detecting the pressure rise caused by a faulted open anode injector, reducing pressure in the fuel cell stack when the fault occurs, and taking remedial action to allow continued operation of the fuel cell stack, and militate against a walk-home incident.

15 Claims, 3 Drawing Sheets

METHOD TO REDUCE PRESSURE WHEN INJECTORS ARE STUCK OPEN UNDER FAULTED CONDITIONS AND REMEDIAL ACTION TO PREVENT WALK-HOME INCIDENT

CROSS-REFERENCE TO RELATED PATENT APPLICATION

This patent application is a continuation patent application of U.S. patent application Ser. No. 11/678,743 filed Feb. 26, 2007, the entire disclosure of which is hereby incorporated herein by reference.

FIELD OF THE INVENTION

This invention relates to a method of operation of a fuel cell system. More particularly, this invention is directed to a method of operating a fuel cell system under faulted conditions caused by component failures.

BACKGROUND OF THE INVENTION

In typical fuel cell systems, anode injectors provide hydrogen to the anode side of the fuel cell stack. A common mode of failure for the anode injectors is to fail in an open state. When the anode injectors fail open, undesirable and uncontrolled amounts of hydrogen is delivered to the anode side of the fuel cell stack. Often, the anode injectors do not signal a failure to the control system, consequently making it difficult to predict a pressure rise or the hydrogen flow in the anode side of the fuel cell stack.

A faulted open injector may cause an increase of pressure on the anode side which can damage the fuel cell stack membrane, and affect the life of the fuel cell stack. The increase in pressure may also damage the fuel cell stack unless the pressure rise is detected and operation of the fuel cell system stopped quickly. Stopping the fuel cell system due to a faulted open injector typically results in the fuel cell being completely inoperable, and an operator being stranded when the fuel cell is powering a vehicle.

It would be desirable to develop a method of operating a fuel cell system capable of detecting the pressure rise caused by a faulted open anode injector, reducing pressure in the fuel cell stack when the fault occurs, taking remedial action to allow continued operation of the fuel cell stack, and militate against a walk-home incident.

SUMMARY OF THE INVENTION

According to the present invention, a method of operating a fuel cell system capable of quickly detecting the pressure rise caused by a faulted open anode injectors, reducing pressure in the fuel cell stack when the fault occurs, taking remedial action to allow continued operation of the fuel cell stack, and militate against a walk-home incident, has surprisingly been discovered.

In one embodiment, the method for operating a fuel cell system, including the steps of providing a fuel cell stack having a plurality of anode injectors in fluid communication with an anode inlet of the fuel cell stack and a control system in electrical communication with the fuel cell stack and the anode injectors, determining if an anode injector has failed in an open state using the control system to monitor for a pressure at predetermined points in the fuel cell stack, and enabling the fuel cell stack to continue operation if an anode injector has failed in an open state using the control system to implement a remedial action.

In another embodiment, the method for operating a fuel cell system, including the steps of providing at least one fuel cell stack having a plurality of anode injectors in fluid communication with an anode inlet of the fuel cell stack, a control system in electrical communication with the anode injectors, a vent valve disposed in a first conduit and in electrical communication with the control system, the first conduit in fluid communication with a fuel tank and the anode injectors, a cathode exhaust in fluid communication with a cathode outlet of the fuel cell stack by a second conduit and adapted to be controlled by the control system, a compressor in fluid communication with a cathode inlet of the fuel cell stack, and a motor mechanically coupled to the compressor and in electrical communication with the control system, controlling the pressure in the fuel cell stack to achieve a desired pressure at predetermined points by selectively controlling the anode injectors and the compressor using the control system, monitoring the actual pressure in the fuel cell stack in at least one predetermined location using the control system, determining if an anode injector has failed in an open state by comparing a desired pressure and the actual pressure in the fuel cell stack, and enabling the fuel cell stack to continue operation if an anode injector has failed in an open state using the control system.

In another embodiment, the method for operating a fuel cell system, including the steps of providing at least one fuel cell stack having a plurality of anode injectors in fluid communication with an anode inlet of the fuel cell stack, a control system in electrical communication with the anode injectors, a vent valve disposed in a first conduit and in electrical communication with the control system, the first conduit in fluid communication with a fuel tank and the anode injectors, a cathode exhaust in fluid communication with a cathode outlet of the fuel cell stack by a second conduit and adapted to be controlled by the control system, a compressor in fluid communication with to a cathode inlet of the fuel cell stack, and a motor mechanically coupled to the compressor and in electrical communication with the control system, controlling the pressure in the fuel cell stack to achieve a desired pressure at predetermined points by selectively controlling the anode injectors and the compressor using the control system, monitoring the actual pressure in the fuel cell stack in at least one predetermined location using the control system, determining if an anode injector has failed open when a difference between a desired pressure and an actual pressure is greater than a predetermined calibrated constant and all the anode injectors are commanded to zero flow, opening the vent valve to decrease a pressure in the fuel cell stack when a failed open anode injector has been determined, controlling the pressure to achieve a desired cathode pressure calculated as the difference of the actual pressure and a delta pressure above atmospheric pressure when a failed open anode injector has been determined, and increasing a flow of air to a cathode side of the fuel cell stack by increasing a speed of the compressor.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
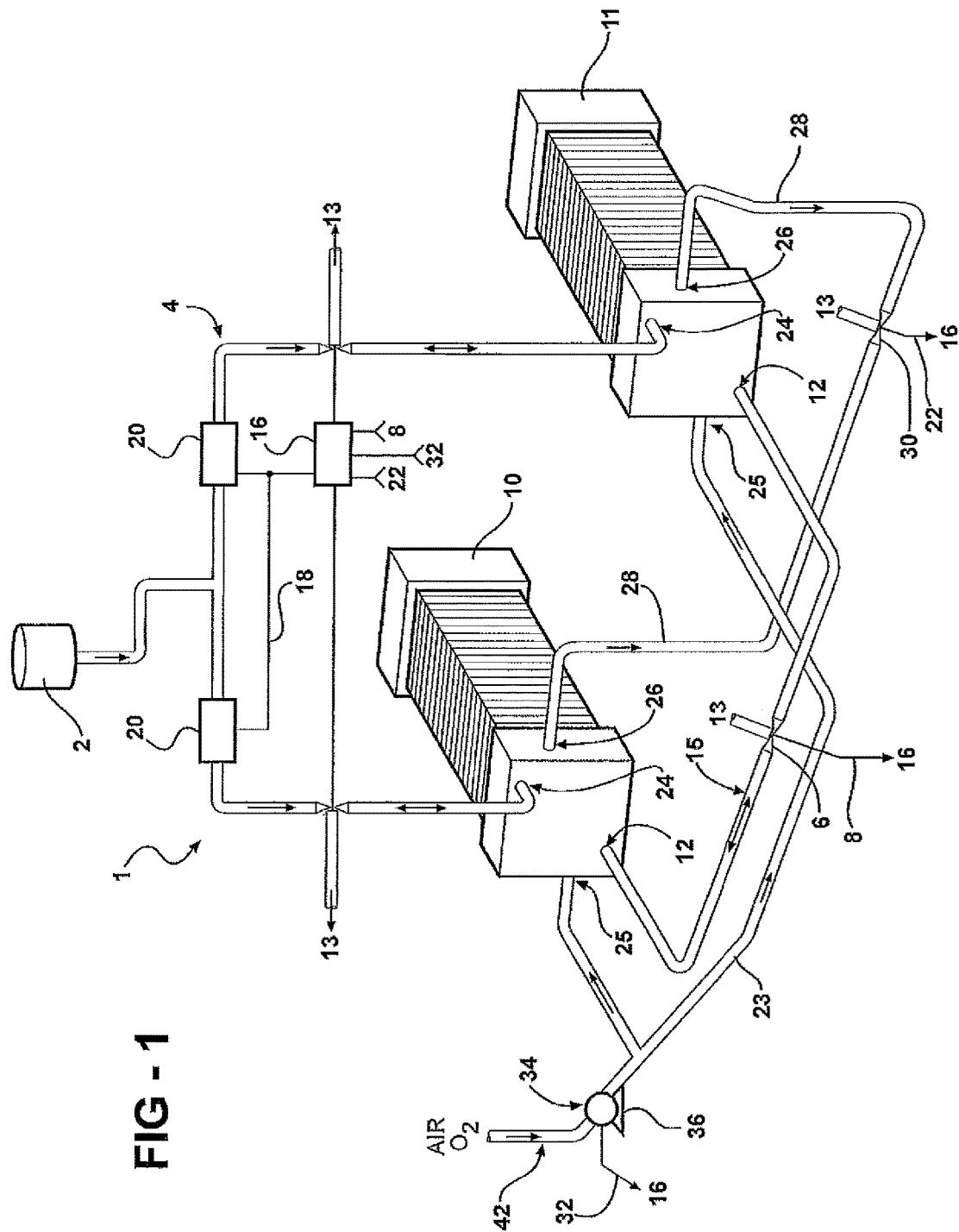
FIG. 1 is a schematic illustration of a fuel cell system according to an embodiment of the invention.

Referring now to FIG. 1, a basic layout of a fuel cell system 1 with associated components is shown. In practice many variants are possible. A schematic representation of a first fuel cell stack 10 and a second fuel cell stack 11 integrated into the fuel cell system 1 is shown. Each of the first fuel cell stack 10 and the second fuel cell stack 11 includes a plurality of individual fuel cells (not shown). The Anode sides (not shown) of all individual fuel cells of the fuel cell stacks 10, 11 are connected in a manner commonly known in the art. In a similar manner, cathode sides (not shown) of the fuel cells of the stacks 10, 11 are connected in a manner commonly known in the art. Remaining structure and operation of various types of fuel cell systems are commonly known in the art. One embodiment can be found in commonly owned U.S. Pat. No. 6,849,352, hereby incorporated herein by reference in its entirety. Therefore, only the structure and operation of a fuel cell system as pertinent to this invention will be explained in the description.

In the exemplary embodiment described herein, the fuel cell system includes a control system 16. The control system 16 is in electrical communication with a plurality of anode injectors 20 via an electrical connection 18. The electrical connection 18 may be any conventional means of electrical communication.

The anode injectors 20 are in fluid communication with a fuel tank 2 via a conduit 4. The anode injectors 20 are also in fluid communication with an anode inlet 24 of the first fuel cell stack 10 and the second fuel cell stack 11. The anode inlets 24 are in fluid communication with anode outlets 12. A conduit 15 fluidly connects the anode outlet 12 of the first fuel cell stack 10 with the anode outlet 12 of the second fuel cell stack 11. A vent valve 6 is disposed in the conduit 15, and is in electrical communication with the control system 16 via an electrical connection 8.

The control system 16 is in electrical communication with a motor 34 via an electrical connection 32. The motor 34 is coupled with a compressor 36. The compressor 36 is in fluid communication with a cathode inlet 25 of the fuel cell stacks 10, 11 via an air supply conduit 23. The conduit 23 can be any conventional conduit providing a sealed passageway.

The cathode sides (not shown) of the fuel cell stacks 10, 11 include a plurality of cathodes (not shown) of the fuel cells connected in a manner commonly known in the art. Each of the fuel cells has a plurality of channels between the cathode inlet 25 and a cathode outlet 26.

The cathode outlets 26 of the fuel cell stacks 10, 11 are in fluid communication with the cathode exhaust valve 30 via a conduit 28. The cathode exhaust valve 30 is in fluid communication with the vent valve 6 via a conduit 13. The control system 16 is in electrical communication with the cathode exhaust valve 30 via an electrical connection 22.

In operation, air is supplied from a source of air (not shown) via a conduit 42, compressed by the compressor 36, and supplied via the conduit 23 to the cathode inlets 25 of the fuel cell stacks 10, 11. The control system 16 can influence the speed of rotation of the air compressor 36 by controlling the motor 34, and thus, the air flow delivered by the air compressor 36. By influencing the air flow delivered on the cathode side (not shown) of the fuel cell system 1, the control system 16 can facilitates reaching a desired air flow and a desired air pressure in the cathode side (not shown) of the fuel cell system 1.

The control system 16 monitors an actual gas pressure at predetermined points. The points may include the anode outlets 12 and the cathode outlets 26 via means commonly known in the art, such as a pressure sensor (not shown), for example. A delta pressure is calculated using the difference between the gas pressure at the anode outlets 12, and the cathode outlets 26.

Hydrogen gas is stored in the fuel tank 2, supplied to the anode injectors 20 via the conduit 4, and selectively injected into the anode inlets 24. Typically, the vent valve 6 is closed during normal operation. The control system 16 can influence the rate of hydrogen delivery to the anode inlets 24 by controlling the position of the anode injectors 20 via the connection 18.

The control system 16 generates and transmits an anode injector signal to each anode injector 20 individually in order to maintain a desired anode pressure in the fuel cell stacks 10, 11. In flow shifting fuel cell systems 1, the control system 16 selectively controls the anode injectors 20 for the first fuel cell stack 10 and the anode injectors 20 for the second fuel cell stack 11 to achieve a desired flow of hydrogen through the fuel cell system, using an anode shift algorithm. It may be desirable to alternate the direction of the flow of hydrogen through the fuel cell system 1 at predetermined time intervals, although other switching times can be used as desired. It is further understood that additional methods of control can be implemented without departing from the scope of the invention.

Typically, when the fuel cell system 1 is operating under normal conditions, the desired anode pressure is equal to the sum of the actual pressure at the cathode outlet 26 and a desired delta pressure determined by the control system 16.

A reaction known per se in the art occurs between the air in the cathode sides (not shown) and the hydrogen in the anode sides (not shown) of the fuel cell stacks 10 that releases electrons which can be drawn by an external circuit and/or vehicle (not shown).

During operation, the anode injectors 20 may fail in an open state. When the anode injectors 20 fail, an undesirable and uncontrolled quantity of gas is delivered to the anode inlets 24. Thus, even when flow is desired to be zero, hydrogen continues to flow into the anode inlets 24, resulting in an excess of pressure on the anode side (not shown) of the fuel cell stacks 10, 11. The pressure increase is directly influenced by the position of the failed anode injectors 20.

Figure 2:
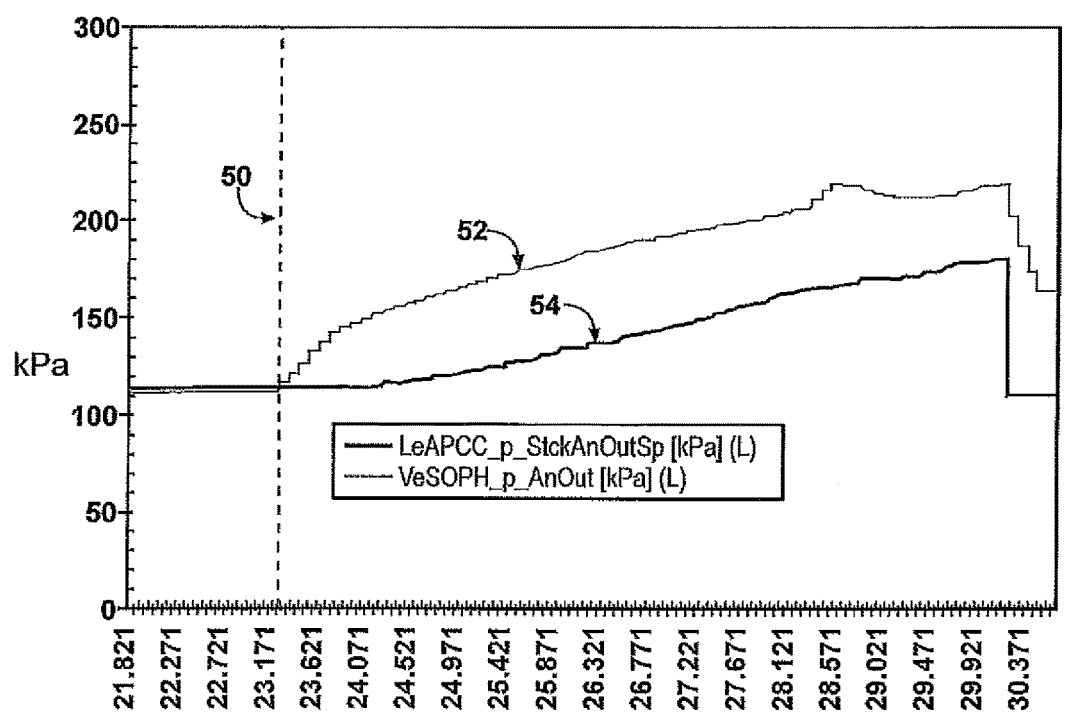
FIG. 2 is a graph showing actual fuel cell pressure and desired fuel cell pressure during normal operation and following a failure of an anode injector.

FIG. 2 is a graph showing an actual fuel cell pressure 52 and a desired fuel cell pressure 54 before and after an anode injector failure 50. When the anode injectors 20 are operating correctly, the desired pressure 54 and the actual pressure 52 are maintained within a calibrated constant. In the embodiment shown, the desired pressure 54 and the actual pressure 52 are typically maintained within a calibrated constant of 3 kPa. After the anode injector failure 50, the actual pressure 52 is greater than the desired pressure 54 and diverges therefrom. In the embodiment shown, the pressure diverges within a time span of about three seconds. It may be desirable for the calibrated constant to be calculated using factors such as a controllability of the anode pressure controls, a fuel cell system 1 pressure drop, and a fuel cell system 1 protection pressure.

There is no known adaptive or real time correction method to correct the anode injector failure 50. If the fuel cell system 1 is shut down after the anode injector failure 50, an operator of the fuel cell system 1 or vehicle (not shown) is stranded.

Figure 3:
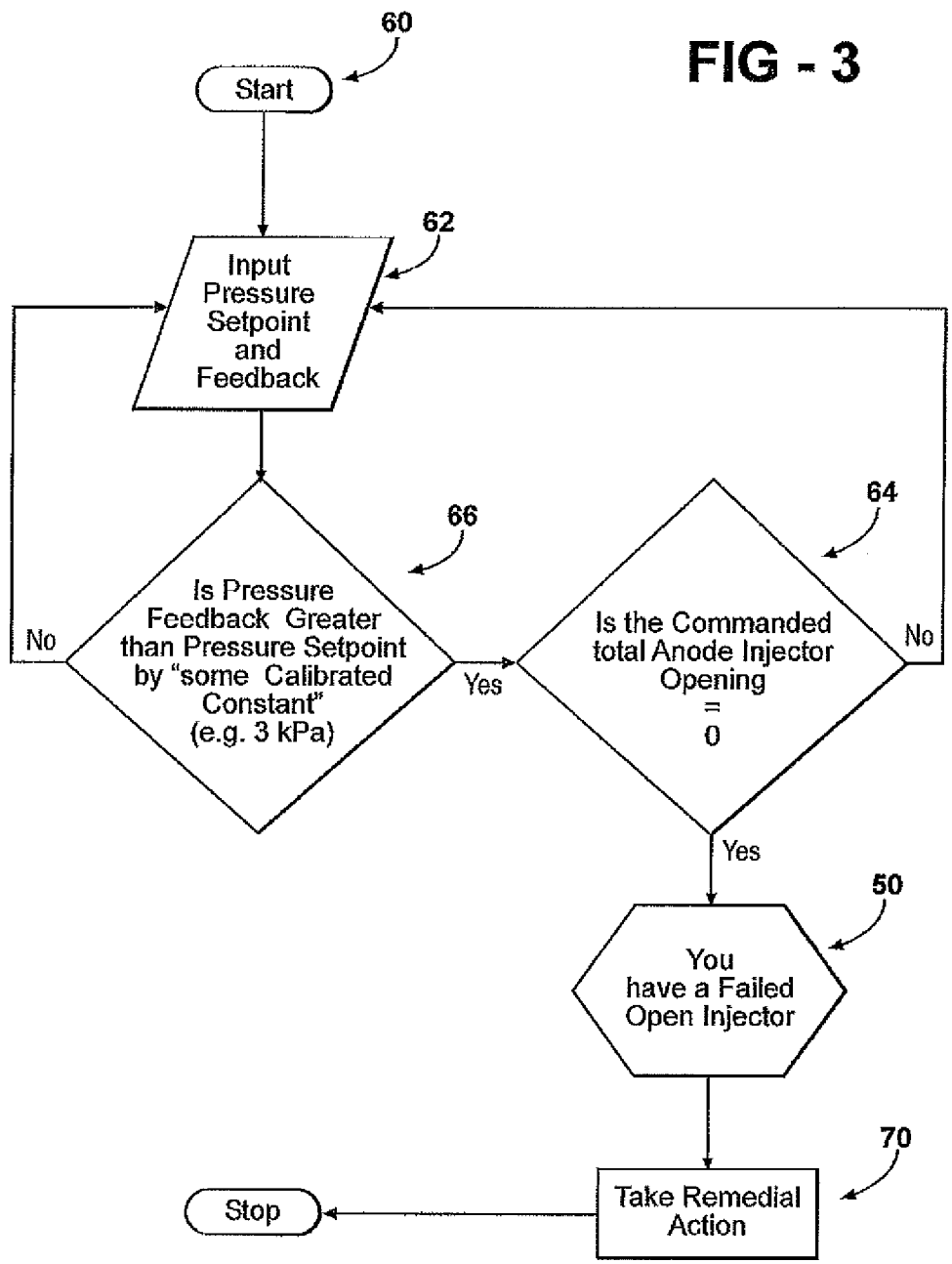
FIG. 3 is a flow diagram illustrating a method of operation of the present invention.

FIG. 3 is a logic flow diagram illustrating a method of operation of the present invention. After a start point 60, the desired pressure 54 set point is entered 62. The control system 16 then monitors the difference between the desired pressure 54 and the actual pressure 52. If the difference between the desired pressure 54 and the actual pressure 52 is greater than the calibrated constant 66, and at least one anode injector 20 is commanded to zero flow 64, then the anode injector failure 50 has occurred. The logic flow diagram facilitates a detection of the anode failure 50 by the control system 16, despite the anode injectors 20 being commanded to zero flow 64.

The control system 16 of the current invention detects the anode failure 50, which allows initiation of a remedial action 70 to enable a continued operation of the fuel cell stacks 10, 11. In the embodiment shown, the remedial action 70 is an opening of the anode vent valve 6 to expose the anode outlet 12 of the fuel cell stacks 10, 11 to a pressure in the cathode exhaust 30. The exposure to the pressure in the cathode exhaust 30 reduces the pressure in the anode sides (not shown). Reducing the pressure in the anode sides (not shown) militates against possible damage to the fuel cell stacks 10, 11. As a result, the uncontrolled hydrogen delivered to the anode sides (not shown) of the fuel cell stacks 10, 11 by the failed open anode injectors 20 vents through the cathode exhaust 30. A remedial desired cathode pressure is determined by the control system 16. The remedial desired cathode pressure is the atmospheric pressure plus the difference between the actual pressure 52 and the desired delta pressure. The remedial desired cathode pressure enables the continued operation of the fuel cell system 1 by controlling the pressure in the cathode sides (not shown) to account for exposure of the fuel cell stacks 10, 11 to the atmospheric pressure, and the venting of fresh hydrogen through the cathode exhaust 30. The control system 16 then increases the speed of the compressor 22 above a normal operating speed to create a higher flow of air through the cathode exhaust 30. Thus, emissions from the fuel cell system are minimized by diluting the fresh hydrogen being vented from the fuel cell system. It may be further desirable for the control system 16 to activate at least one of a check engine light (not shown) and a service engine now light (not shown), which will prompt the operator to replace the anode injector 20, and notify the operator that fresh hydrogen is being released from the vehicle. It is understood that other remedial actions can be taken, as desired.

It may be further desirable, in fuel cell systems using anode shift methods, to stop the operation of the anode shift algorithm and not change direction of the flow. Instead, hydrogen flow into the fuel cell stacks 10, 11 should be balanced in equal percentages, and both the anode injectors for the first fuel cell stack 10 and second fuel cell stack 11 should be in operation.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A method for operating a fuel cell system, the method comprising:
   operating a first fuel cell stack having a plurality of first anode injectors in fluid communication with a first anode inlet of the first fuel cell stack, and a control system in electrical communication with the first fuel cell stack and the first anode injectors;
   determining if one of the first anode injectors has failed in an open state using the control system to monitor for respective pressures at predetermined points in the fuel cell stack by monitoring a difference between a desired pressure and an actual pressure in the fuel cell system and determining if the one of the first anode injectors has failed open when the difference is greater than a predetermined calibrated constant and all of the first anode injectors are commanded to zero; and
   enabling the first fuel cell stack to continue operation if the one of the first anode injector has failed in an open state using the control system to open a vent valve disposed downstream from a first anode outlet of the first fuel cell stack to decrease a pressure in the first fuel cell stack, wherein opening of the vent valve exposes the first anode outlet of the first fuel cell stack to a pressure in a first cathode exhaust.

2. The method according to claim 1, further comprising the steps of:
   operating a second fuel cell stack having a plurality of second anode injectors in fluid communication with a second anode inlet of the second fuel cell stack, the control system in electrical communication with the second fuel cell stack and the second anode injectors; and
   wherein the enabling further includes disabling an anode shift algorithm, the anode shift algorithm configured to selectively control the first anode injectors and the second anode injectors, so both the first anode injectors and the second anode injectors are in operation.

3. The method according to claim 1, wherein the enabling further includes controlling a pressure to achieve a desired cathode pressure calculated as a difference of an actual pressure and a delta pressure above atmospheric pressure.

4. A method for operating a fuel cell system, the method comprising:
   operating a first fuel cell stack having a plurality of first anode injectors in fluid communication with a first anode inlet of the first fuel cell stack and a control system in electrical communication with the first fuel cell stack and the first anode injectors;
   operating a second fuel cell stack having a plurality of second anode injectors in fluid communication with a second anode inlet of the second fuel cell stack, the control system in electrical communication with the second fuel cell stack and the second anode injectors,
   determining if one of the first anode injectors has failed in an open state using the control system to monitor for a pressure at predetermined points in the fuel cell stack; and
   enabling the first fuel cell stack to continue operation if the one of the first anode injector has failed in an open state, the enabling including using the control system to:
      open a vent valve disposed downstream from a first anode outlet of the first fuel cell stack to decrease a pressure in the first fuel cell stack, wherein opening of the vent valve exposes the first anode outlet of the first fuel cell stack to a pressure in a first cathode exhaust; and disabling an anode shift algorithm, the anode shift algorithm configured to selectively control the first anode injectors and the second anode injectors, so both the first anode injectors and the second anode injectors are in operation.

5. The method according to claim 4, wherein the enabling further includes controlling a pressure to achieve a desired cathode pressure calculated as a difference of an actual pressure and a delta pressure above atmospheric pressure.

6. A method for operating a fuel cell system, the fuel cell system including a fuel cell stack with a cathode inlet, a cathode outlet, a cathode exhaust fluidly connected to the cathode outlet, an anode inlet, an anode outlet, and multiple anode injectors fluidly connected to the anode inlet, the method comprising:

monitoring, via an electronic control system communicating with one or more pressure sensors, respective pressures at predetermined points in the fuel cell stack;

determining, via the electronic control system based on signals of the one or more pressure sensors, if one or more of the anode injectors failed in an open state;

enabling, via the control system responsive to a determination that one or more of the anode injectors has failed in an open state, the fuel cell stack to continue operation, the enabling including commanding a vent valve disposed downstream from the anode outlet to open, wherein opening the vent valve exposes the anode outlet to the cathode exhaust and thereby decreases a stack pressure in the fuel cell stack; and controlling the vent valve to provide a remedial cathode pressure, the remedial cathode pressure calculated as atmospheric pressure plus a difference between an actual cathode pressure and a delta cathode pressure.

7. The method of claim 6, wherein determining if one or more of the anode injectors failed in an open state includes: calculating a difference between a desired anode set point pressure and an actual anode pressure, and determining if the difference is greater than a calibrated constant.

8. The method of claim 7, wherein determining if one or more of the anode injectors failed in an open state further includes calculating the difference while commanding at least one of the anode injectors to a zero flow.

9. The method of claim 6, wherein opening the vent valve vents hydrogen gas delivered by the failed one or more anode injectors through the cathode exhaust.

10. The method of claim 9, further comprising increasing a flow of air to the cathode exhaust via the cathode outlet such that the increased flow of air dilutes the hydrogen gas vented through the cathode exhaust.

11. The method of claim 6, wherein the fuel cell system further includes a second fuel cell stack with a second anode inlet and multiple second anode injectors fluidly connected to the second anode inlet, the method further comprising disabling an anode shift algorithm configured to selectively control the first and second anode injectors such that both the first and second anode injectors are in operation.

12. The method of claim 6, further comprising the control system activating a visual prompt operable to notify an operator to service the fuel cell system.

13. The method of claim 6, further comprising the control system disabling an anode shift algorithm configured to selectively control the anode injectors such that all of the anode injectors are in operation.

14. The method of claim 6, further comprising increasing a flow of air to the cathode inlet of the fuel cell stack by increasing a current compressor speed of a compressor relative to a prior compressor speed of the compressor prior to determining that one or more of the anode injectors failed in the open state.

15. The method of claim 6, further comprising using an anode shift algorithm to transmit a respective anode injector signal to each of the anode injectors to individually control the anode injectors, wherein the anode injectors are individually controlled to maintain a desired anode pressure in the fuel cell stack and provide a desired flow of hydrogen through the fuel cell system.

* * * * *